(12) United States Patent
Pierce

(10) Patent No.: US 7,178,132 B2
(45) Date of Patent: Feb. 13, 2007

(54) FORWARD WALKING THROUGH BINARY CODE TO DETERMINE OFFSETS FOR STACK WALKING

(75) Inventor: Kenneth Bryant Pierce, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 643 days.

(21) Appl. No.: 10/279,550

(22) Filed: Oct. 23, 2002

(65) Prior Publication Data
US 2004/0083460 A1 Apr. 29, 2004

(51) Int. Cl.
G06F 9/44 (2006.01)
G06F 9/45 (2006.01)
G06F 7/38 (2006.01)
G06F 13/24 (2006.01)

(52) U.S. Cl. .................. 717/127; 717/154; 717/155; 712/233; 710/260

(58) Field of Classification Search .............. 717/127, 717/138, 155, 242
See application file for complete search history.

(56) References Cited

U.S. PATENT DOCUMENTS

| | | | | |
|---|---|---|---|---|
| 5,530,870 | A | * | 6/1996 | De Bruler ............ 717/155 |
| 5,864,707 | A | * | 1/1999 | Tran et al. ........... 712/23 |
| 6,009,258 | A | | 12/1999 | Elliott |
| 6,091,897 | A | * | 7/2000 | Yates et al. .......... 717/138 |
| 6,151,569 | A | | 11/2000 | Elliott |
| 6,442,751 | B1 | | 8/2002 | Cocchi et al. |
| 6,901,587 | B2 | * | 5/2005 | Kramskoy et al. ...... 717/154 |
| 7,039,738 | B2 | * | 5/2006 | Plummer et al. ....... 710/260 |

OTHER PUBLICATIONS

"Debugging with GDB", by Richard Stallman, http://web.archive.org/web/20010311020130/www.cs.utah.edu/dept/old/texinfo/gdb/gdb_1.html.*
"Second Approach: Extended Stack Introspection" found at http://www.cs.princeton.edu/sip/pub/sosp97/node8.html, pp. 1-5, printed from Internet on Sep. 29, 2002.
"Extensible Security Architectures for Java", 16th Symposium on Operating Systems Principles, by Dan S. Wallach, Dirk Balfanz, Drew Dean and Edward W. Felton, Oct. 1997, pp. 1-26.
"Safkasi: A Security Mechanism for Language-based Systems", Proeedings of the 1998 IEEE Symposium on Security and Privacy, by Dan S. Wallach, Andrew W. Appel and Edward W. Felten, May 1998, pp. 1-32.
"Run Time Environments and Memory Management", The Computer Science and Engineering Handbook, by Robert E. Noonan and William L. Bynum, 1997, pp. 2166-2189.

(Continued)

Primary Examiner—Wei Zhen
Assistant Examiner—Chih-Ching Chow
(74) Attorney, Agent, or Firm—Klarquist Sparkman LLP

(57) ABSTRACT

A method used for walking forward through a binary image of a procedure to identify a return instruction, and while walking forward through the binary image, identifying a set of instructions that affect the distance to a return address stored in the stack. After calculating distance structure variables based on the set of instructions, and using the distance structure variables to update the stack pointer and the instruction pointer, returning to walk forward through the binary image pointed to by the updated instruction pointer. This continues until the stack is empty, and then a list of all instruction pointers are returned, as a call chain. An additional optimization includes caching a list on instruction pointer addresses with already computed distance structure variables.

22 Claims, 19 Drawing Sheets

OTHER PUBLICATIONS

"Welcome to Magellan 4 Code-Injection", located at http://msrweb/pprc/tools/magellan/help, 8 pages, printed from Internet on Sep. 10, 2002.

"Pushdown Stacks", *Computer Organization*, by V.Carl Hamacher, Zvonko G. Vranesic and Safwat G. Zaky, 1984, pp. 54-114.

"Stack Trace Exceptions in Win32", *C/C++ Users Journal*, vol. 15, No. 6, by Dr. Carlo Pescio, Jun. 1998, 1984, pp. 1-6.

"Call Stack Window (Microsoft Script Debugger)", *Microsoft Corporation*, located at http://activedeveloper.dk/iishelp/debut/sdbug_41.htm, 1 page, printed from the Internet on Sep. 9, 2002.

"Getting Started with Netscape JavaScript Debugger", *Netscape Communications Corporation*, located at http://developer.netscape.com/docs/manuals/jsdebut/contents.htm, pp. 1-18, printed from the Internet on Sep. 9, 2002.

"Session 8121/8122 OS/390 C/C++: XP Link, The Details", by Graham Ewart, Feb. 2001, 36 pages.

"Using Stack-Walking to Troubleshoot a NetWare Abend", *Novel AppNotes*, by Paul Coletti, Jun. 1999, pp. 63-74.

"Selfi386 Implementation Details", located at http://www.cichon.de/self/Implementation.html, by Gordon Cichon, pp. 1-3, printed from the Internet Sep. 9, 2002.

"DbgHelp Functions", *Microsoft Corporation*, located at http://msdn.microsoft.com/library/en-us/debug/base/dbghelp, pp. 1-3, printed from the Internet on Aug. 29, 2002.

"StackWalk64", *Microsoft Corporation*, located at http://msdn.microsoft.com/library/en-us/debug/base/stackwalk64.asp?frame, pp. 1-2, printed from the Internet on Aug. 29, 2002.

Stallman et al., "Debugging with GDB: The GNU Source-Level Debugger," Edition 4.09, for GDB version 4.9, Aug. 1993, published by Free Software Foundation, 181 pages.

* cited by examiner

| DISTANCE STRUCTURE | |
|---|---|
| 602 — IPDist | 0 — 614 |
| 604 — SPDist | 0 — 616 |
| 606 — FPDist | 0 — 618 |
| 608 — IsFPRel | false — 620 |
| 610 — UpDatesFP | false — 622 |
| 612 — Unknowns | 0 — 624 |

Fig. 7

| Instruction Type | Corresponding Function |
|---|---|
| RET | SPDist += 4 + return amount;<br>(Note: the "return amount" is encoded within the return instruction) |
| PUSH | IPDist -= 4; |
| POP | If (POP FP) then<br>    UpDatesFP = true,<br>    FPDist = IPDist,<br>    IPDist = 0;<br>IPDist += 4; |
| MOV | If (MOV SP, FP) then<br>    IsFPRel = true,<br>    FPDist = 0,<br>    IPDist = 0; |
| LEAVE | IsFPRel = true,<br>UpDatesFP = true,<br>FPDist = 0,<br>IPDist = 4; |
| SUB | If (SUB SP, value), then<br>    IPDist -= value;<br>(Note: the "value" is encoded in the instruction) |
| ADD | If (ADD SP, value), then<br>    IPDist += value;<br>(Note: the "value" is encoded in the instruction) |
| CALL | If CALL is direct, then<br>    1. Compute the call target,<br>    2. Search from the target to any return instruction,<br>    3. If a return instruction is found, then<br>        IpDist += return amount<br>    else<br>        Unknowns ++;<br><br>If CALL is indirect,<br>    If it is an imported function call, then<br>        Calculate the target using rules that govern import/export tables, then treat as a direct call<br>    else<br>        Unknowns++; |

PATH OF INSTRUCTIONS 800

802 → ADD SP, 12
804 → POP FP
806 → RET 4

PATH OF INSTRUCTIONS 900

902 → MOV SP, FP
904 → POP FP
906 → RET

```
1002 →  If (IsFPRel == true) then
            NewDS.StackPointer = OldDS.FramePointer;
1004 →  NewDS.StackPointer = OldDS.StackPointer + FPDist;
1006 →  If (UpDatesFP == true) then
            NewDS.FramePointer = *(NewDS.StackPointer);
1008 →  NewDS.StackPointer += IPDist;
1010 →  NewDS.InstructionPointer = *(NewDS.StackPointer);
1012 →  NewDS.StackPointer += SpDist;
1014 →  If (Unknowns != 0) then
            ReturnAddressFind();
```

OldDS

| Data Structure | |
|---|---|
| StackPointer | points at stack |
| InstructionPointer | points to DLL |
| FramePointer | points at stack |

NewDS

| Data Structure | |
|---|---|
| StackPointer | points at stack |
| InstructionPointer | points to DLL |
| FramePointer | points at stack |

Fig. 13

STACK 1300

| ADDRESS | CONTENT |
|---|---|
| ⋮ | ⋮ |
| CE4C | |
| CE48 | |
| CE44 ← 1308 | |
| CE40 ← 1306 | PARAMETER = F |
| CE3C | RETURN ADDRESS = E |
| CE38 ← 1304 | FRAME ADDRESS = D |
| CE34 | LOCAL VAR = C |
| CE30 | LOCAL VAR = B |
| CE2C ← 1302 | LOCAL VAR = A |
| CE28 | |
| CE24 | |
| ⋮ | ⋮ |

Fig. 16

| Addr | Code | SP | SP Fewest IC |
|---|---|---|---|
| C050 | Test ecx,0 | 1 | 1 |
| C060 | Jz C070 | 2 | 2 |
| C062 | Push eax | - | 3 |
| C064 | Call Foo | - | 4 |
| C066 | Jmp C080 | - | 5 |
| C070 | Call Ecx ←1612 | 3 | - |
| C080 | Pop ebp | 4 | 6 |
| C082 | ret | 5 ←1610 | 7 ←1614 |

Fig. 17

| Path | DS Transformation |
|---|---|
| (Function Foo) | |
| | (0, 0, 0, F, F, 0) ←1706 |
| Push dword ptr [ecx] ←1708 | (-4, 0, 0, F, F, 0) ←1712 |
| Call Bar ←1704 | (8, 0, 0, F, F, 0) ←1716 |
| Add esp, 20 ←1718 | (28, 0, 0, F, F, 0) ←1720 |
| Pop ebp ←1722 | (4, 0, 28, F, T, 0) ←1724 |
| Ret ←1726 | (4, 4, 28, F, T, 0) ←1728 |
| | |
| (Function Bar) | |
| | |
| Ret 12 ←1714 | |

| Path (1902) | DS Transformation (1912) |
|---|---|
| (Procedure 1, DLL 1) ←1906 | (0, 0, 0, F, F, 0) ←1908 |
| Push ebp ←1910 | (-4, 0, 0, F, F, 0) ←1914 |
| Sub esp, 20 ←1916 | (-24, 0, 0, F, F, 0) ←1918 |
| Push 15 | (-28, 0, 0, F, F, 0) |
| Push eax | (-32, 0, 0, F, F, 0) |
| Push dword ptr [ecx] | (-36, 0, 0, F, F, 0) |
| Call [DD05] ←1904 | (-24, 0, 0, F, F, 0) ←1922 |
| Pop ebp | (4, 0, -24, F, T, 0) |
| Ret | (4, 4, -24, F, T, 0) ←1924 |
| (Procedure 7, DLL 2) | |
| Ret 12 ←1920 | |

Fig. 20

| Path (ProcedureA) | DS Transformation |
|---|---|
|  | (0, 0, 0, F, F, 0) |
| Push 15 ←—2006 | (-4, 0, 0, F, F, 0) ←—2008 |
| Call ecx ←—2010 | (-4, 0, 0, F, F, 1) ←—2012 |
| Ret 4 ←—2014 | (-4, 8, 0, F, F, 1) ←—2016 |

2002 labels Path; 2004 labels DS Transformation.

Fig. 21

STACK 2100

| ADDRESS | CONTENT |
|---|---|
| ⋮ | ⋮ |
| CE00C | LOCAL VAR = F |
| CE008 | PARAMETER = R |
| CE004 | RETURN ADDRESS |
| CE000 | PARTIAL PARAMETERS FOR CALL TO ECX |

2102 brackets the top three data rows; 2104 brackets the CE000 row; 2106 points to CE004.

Fig. 22

DLL/Binary Image

| Path (FunctionZ) | DS Transformation |
|---|---|
|  | (0, 0, 0, F, F, 0) ← 2306 |
| Sub esp, 20 ← 2308 | (-20, 0, 0, F, F, 0) ← 2312 |
| Leave ← 2304 | (4, 0, 0, T, T, 0) ← 2314 |
| Ret ← 2316 | (4, 4, 0, T, T, 0) ← 2318 |

| Path | DS Transformation |
|---|---|
| (FunctionR) | |
| | (0, 0, 0, F, F, 0) ←—2408 |
| Sub esp, 20 ←—2410 | (-20, 0, 0, F, F, 0) ←—2412 |
| Mov esp, ebp ←—2404 | (0, 0, 0, T, F, 0) ←—2414 |
| Pop ebp ←—2406 | (4, 0, 0, T, T, 0) ←—2416 |
| Ret ←—2418 | (4, 4, 0, T, T, 0) ←—2420 |

| Addr | Code |
|---|---|
| 0xc0c0 | Call CheckForInput |
| 0xc0c4 | Call Sleep |
| 0xc0c6 | Jmp c0c0 ←—2504 |
| 0xc0c7 | Ret ←—2502 |

FORWARD WALKING THROUGH BINARY CODE TO DETERMINE OFFSETS FOR STACK WALKING

TECHNICAL FIELD

This invention relates to identifying return addresses in an interrupted program's call stack, and more particularly, identifying the return addresses using information obtained while following the control flow through the binary code of procedures in the call chain.

BACKGROUND AND SUMMARY

For performance monitoring, profiling, and many other reasons, it is useful to walk the call stack of a program, process, or thread (hereafter "program").

An executing program will have many functions, procedures, or methods (hereafter, "procedures") that are called in order to carry out the program's purposes. As the program executes, procedures call other procedures, and at any given time of execution, a call stack contains state information about a call chain. Since the same procedure may be called from multiple other procedures, it is valuable in performance monitoring to determine which procedure called a procedure.

For example, the program (i.e., "Main( )") shown in Table 1, contains four procedures—NewRecord( ), EditName( ), EditAddress( ), and UpdateRecord( ). In this program Edit-Name( ) can be called from two different places in Main( ), namely NewRecord( ) and UpdateRecord( ). While monitoring Main( ), it can be useful to know whether EditName( ) is called more often from NewRecord( ) or UpdateRecord( ).

TABLE 1

Main( )
   NewRecord( )
      EditName( )
      EditAddress( )
   UpdateRecord( )
      EditName( )

During monitoring Main( ) it may be determined that EditName( ) is taking too much time. This information is useful in determining which procedures need to be further optimized. In order to determine which procedures are calling EditName( ), the call stack can be walked upon entering EditName( ).

Table 2 is an example of a call chain from Main( ) to EditName( ). The call chain shows that Main( ) called UpdateRecord( ), and UpdateRecord( ) called EditName( ). It is not unusual for a call chain to have tens or hundreds of procedures.

TABLE 2

Enter Main( )
   Enter UpdateRecord( )
      Enter EditName( )

In limited cases, a profiler can be used to assemble information about call chains. For example, if the source code is available, a compiler can be used to insert code that reports call chain information. In another case, if debug information is provided about a procedure, a binary injection tool can be used to instrument a procedure. If debug information is available, code can be injected into the binary image of the procedure, and the injected code will report when the procedure is entered and or exited. For example, if all the procedures in Main( ) are instrumented, an example executing call chain could appear as shown in Table 3.

TABLE 3

Enter Main( )
   Enter UpdateRecord( )
      Enter EditName( )
      Exit EditName( )
   Exit UpdateRecord( )
Exit Main( )

A program may contain hundreds or thousands of procedures, some of which may be obtained from third party sources. If the instrumentation is done with a compiler, the source code may not be available from these third party sources. If the instrumentation is done with a code injector, debug information (i.e., "PDB") is needed about the procedures. Again, this information may not be available if procedure are obtained from third parties. For many reasons, the source code and or this PDB information may not be available, or may be impractical to obtain. Thus, a call chain can not be reliably obtained in many circumstances.

Another technique for obtaining a call chain, involves sampling a program's state and then walking the call stack to obtain call chain information. However, this traditional method requires the stack to have a chain of base pointers, or requires using the PDB information to identify the return addresses within the call stack frames.

A stack is a region of memory where programs store status data such as procedure addresses, passed parameters, and local variables. FIG. 1 is an example stack 100. In these examples, the top of the stack is a low address, so the stack grows downward as data is pushed onto the stack. A stack includes return addresses 102, which tell the processor where to return upon completing execution in the present active frame. The stack may also contain input parameters 104 received by the procedure as input and possibly local variables 106. The stack may also contain a frame pointer 108, which points 110 to the previous stack frame. In some cases, each stack frame may contain a frame pointer 112 to the previous stack frame base. In one example, a traditional stack walker follows the frame pointers to walk the stack 110, 112.

However, in some cases, the stack frames created by a procedure are further optimized, so that they do not contain the frame pointers. In such a case, the stack can be walked using the PDB (debug) information to determine the stack frame contents. For example, FIG. 1 shows three stack frames 114, 116, 118. The top of the stack contains the activated frame 118, and the stack pointer 120 points to the top of the stack 100. Each stack frame 114, 116, 118 is specific to a procedure in the call chain, and thus may vary in size based on the content required by the procedure it represents (e.g., passed parameters, local variables, etc.) By using the PDB information obtained at debug or compile time, a stack walker can determine the depth, contents, or offsets for a stack frame for each compiled procedure. From this information, it may be possible to walk the stack. However, the PDB information is not available in many cases.

In practice, many of the procedures used by a program developer are obtained from third party sources. These third party sources are often unwilling to provide source code or PDB information. In other cases, these third party sources use proprietary systems to create PDB information, and are unwilling to disclose anything that may jeopardize a competitive advantage which may become apparent from viewing this PDB information. In other cases, a program may contain stack frames created by procedures obtained from multiple sources. These multiple sources may be unwilling to agree on whether to include frame pointers in stack frames. Thus, a program may contain some procedures with PDB information, other procedures with frame pointers, and likely, some procedures with neither. Finally, even if all the PDB information is available, many scenarios occur when prior art stack walkers fail. Thus, the prior art stack walkers are unable to reliably walk the stack.

What is needed is a way to walk the stack without relying on PDB information. More specifically, what is needed is a way to walk the stack using the image that is currently executing (i.e., the binary code of the presently executing procedure), the stack, and the instruction pointer (i.e., the pointer to the instruction executing when the program was frozen or interrupted).

A forward code walking technique described herein produces call chain information from the call stack. In one respect, the technique uses an instruction pointer, a stack pointer, a binary image, and a call stack, to obtain a call chain for an interrupted program.

In a further respect, a technique walks forward through the binary code of a procedure (i.e. a binary image for the procedure) to identify a return instruction. While walking forward through the binary image, the technique identifies a set of instructions that alter the distance from the top of the stack to a return address on the stack. After calculating distance variables based on the set of instructions, the technique uses the distance variables to update the stack pointer and the instruction pointer. The updated instruction pointer points to the procedure that called this procedure. The technique then walks forward through the binary image of the procedure that called this procedure. This continues until the stack is empty. A list of instruction pointers are returned as a call chain.

In yet another respect, a system for profiling call chains for an interrupted executing program is discussed. Upon each interrupt, the state information for the executing process is saved. A method walks forward through the executable instructions representing each procedure in the call chain to a return instruction in each procedure. The executable instructions encountered in the forward walk are analyzed and used to locate the return address to each procedure's corresponding calling procedure in the call chain. When the return addresses for all calling procedures in the chain have been located, a list of return addresses are returned.

In another respect, a distance data structure is computed for each stack frame in the call chain, and the distance data structure is used to update the stack pointer and instruction pointer to the context of the calling procedures stack frame. In one implementation, the optimization includes caching a list of instruction pointer addresses with already computed distance structures. This optimization allows reusing a distance structure for an already computed instruction pointer address. This optimization is valuable in profiling when a return address may appear multiple times in a call chain, or multiple call chains may contain the same return address. A further optimization, includes storing ranges of addresses that have the same distance structures.

Additional features and advantages will be made apparent from the following detailed description of the illustrated embodiment which proceeds with reference to the accompanying drawings.

BRIEF DESCRIPTION OF THE DRAWINGS

FIG. 6 is a distance structure used to store variables for updating the instruction pointer, and stack pointer.

FIG. 7 is a list of instructions and corresponding functions used to calculate the distance data structure described in FIG. 6.

FIG. 10 is a set of instructions that update the stack pointer and instruction pointer using variables in the distance structure of FIG. 6.

FIG. 11 is a data structure that holds the old stack pointer and instruction pointer.

FIG. 12 is a data structure that holds the new stack pointer and instruction pointer.

FIG. 13 is a diagram of a stack frame showing how the stack pointer and instruction pointer are updated.

FIG. 16 is an example breadth-first-search comparing shortest path to shortest path without fewest indirect calls.

FIG. 17 is a path of instructions found in the control flow and an accompanying distance structure transformation.

FIG. 20 is a path of instructions found in the control flow and an accompanying distance structure transformation used in a heuristic discussion.

FIG. 21 is an example stack used in a heuristic discussion.

FIG. 22 is a binary image used in a heuristic discussion.

FIG. 23 is a path of instructions found in the control flow and an accompanying distance structure transformation.

FIG. 24 is a path of instructions found in the control flow and an accompanying distance structure transformation.

FIG. 25 is an path of instructions including an infinite loop.

DETAILED DESCRIPTION

The following is a detailed description of an implementation of a method and system for walking a call stack.

Figure 1:
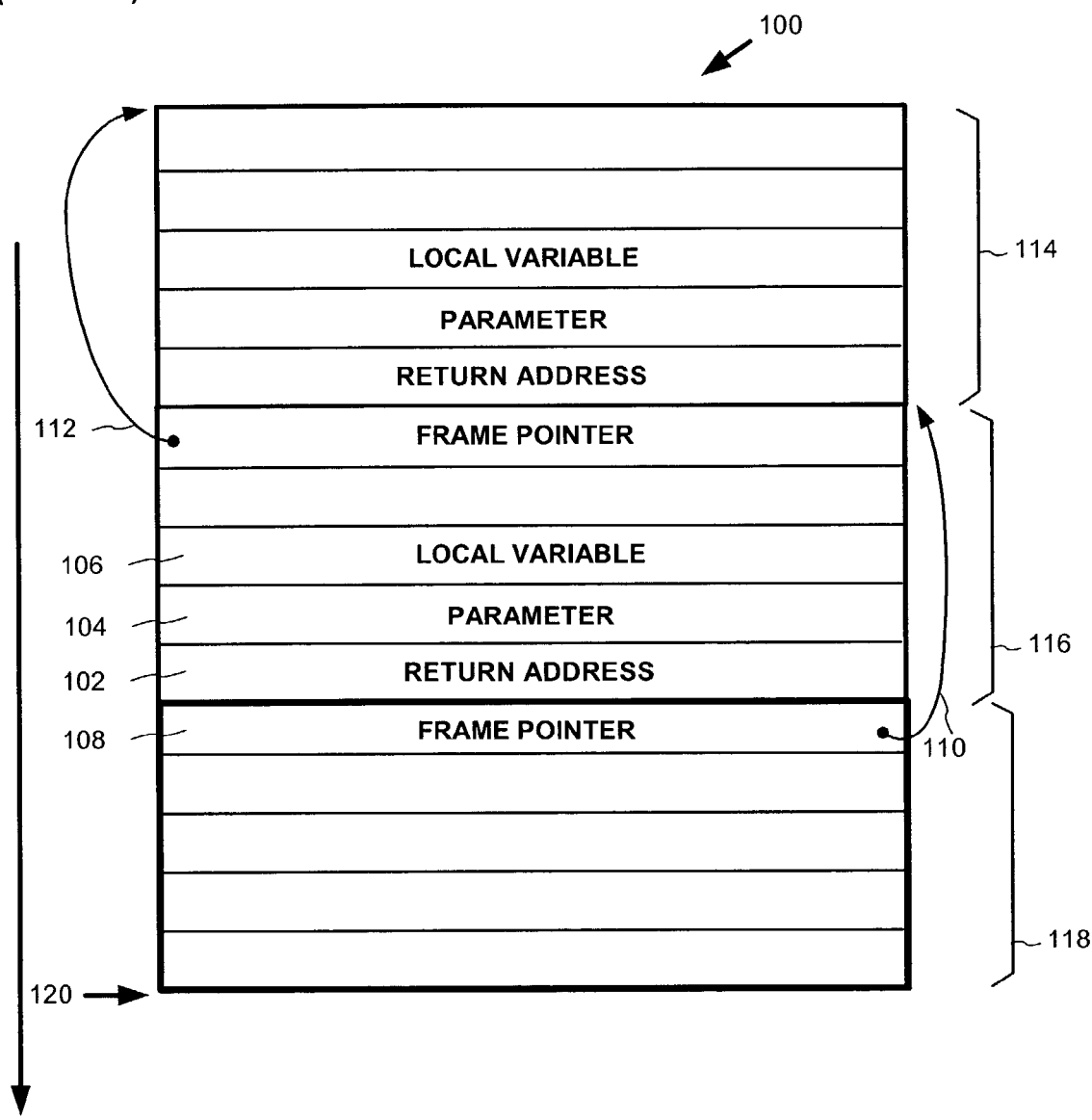
FIG. 1 is a diagram of a prior art frame-pointer-address-relative stack.
Figure 2:
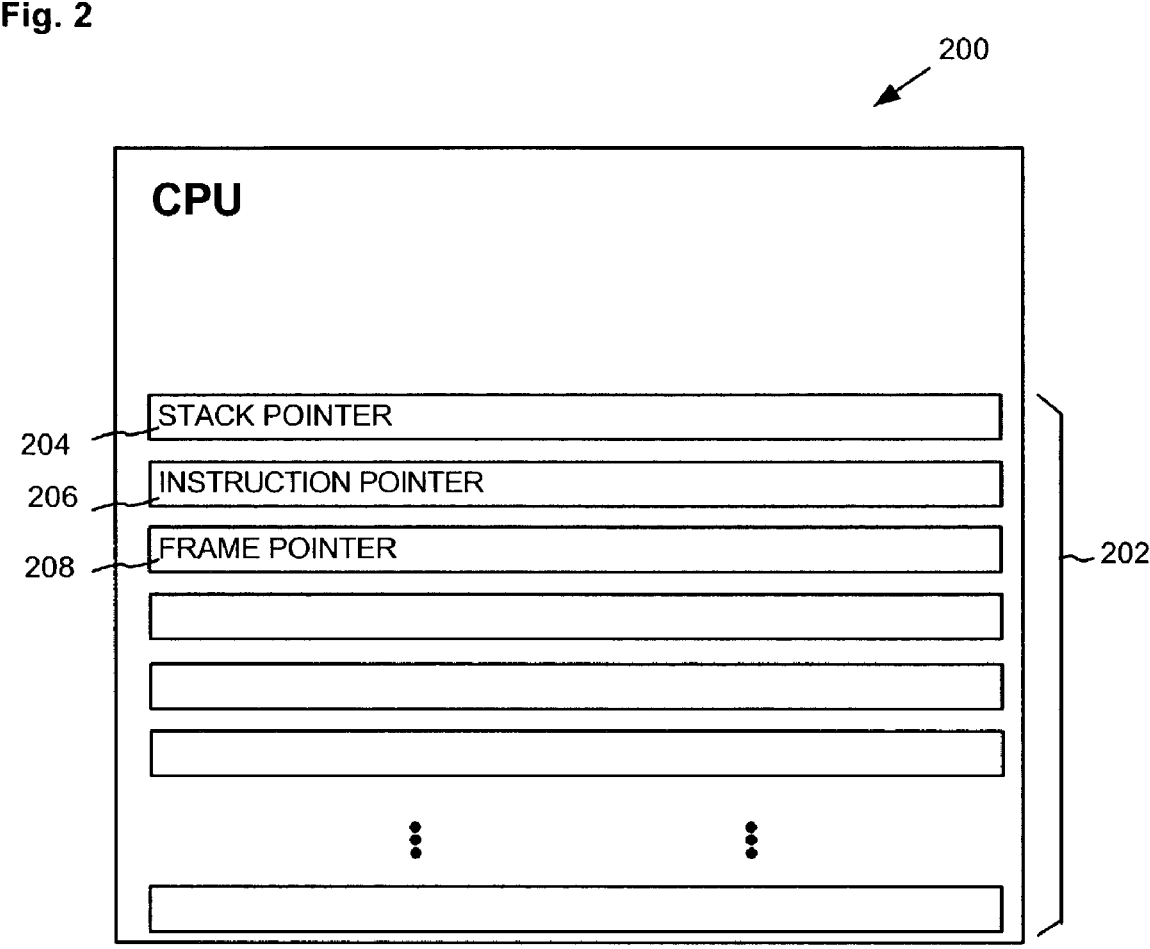
FIG. 2 is a diagram of a central processing unit including registers.

When a program is interrupted or sampled, the central processing unit (CPU) stores state information about the interrupted program in memory. For example, in FIG. 2, the CPU 200 contains a number of registers 202 which can be stored when an executing process is interrupted. One register may contain a stack pointer 204, that contains the current address of the top element of the stack. Another register 206, may contain an instruction pointer that points to the address of the instruction executing at the time of the interruption. Another register 208, may contain a frame pointer that points to the current activation record. An activation record (a.k.a. a data frame or a stack frame) is a data structure containing parameters and variables belonging to an executing procedure, and in some cases, links to other activation records. Activation records are usually created on the stack upon entry into a procedure, and removed from the stack upon exit from the procedure.

A program profiler, debugger, or other executive process will freeze an executing program and save the state information as input to the illustrated stack walker. Or in the case of a thread, the thread will not be rescheduled, but instead the state information will be passed to a stack walker. In either case, the frozen process or unscheduled process is discussed as an interrupt.

Figure 3:
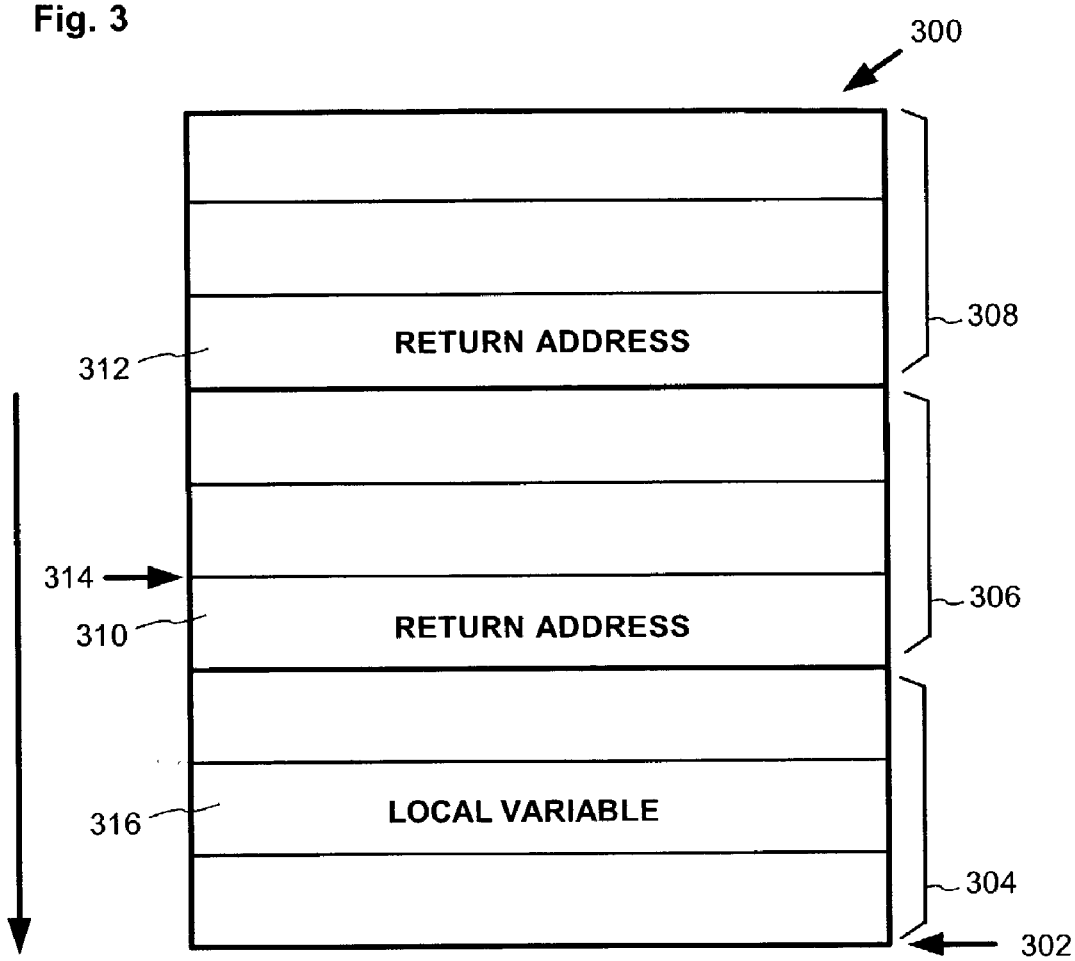
FIG. 3 is a diagram of a call stack showing a call chain with return addresses.

FIG. 3 represents a call stack 300 for a series of procedures. For example, when a procedure called Main( ) is executing, it may have certain variables and parameters on the stack in a corresponding stack frame 308. While executing, Main( ) may call another procedure called NewRecord( ) to do work required in the program. Since execution will return to Main( ) upon completion of work by NewRecord( ), state information about Main( ) is saved on the stack 300 in a stack frame 308 associated with Main( ). Additionally, the address where execution should continue upon return to Main( ) is pushed onto the stack as a return address 312. Before NewRecord( ) begins executing, space may be allocated for its input parameters, local variables, and other data, on a stack frame 306 associated with NewRecord( ). While executing, NewRecord( ) may call another procedure called EditName( ) to do work required in the program. Since execution will return to NewRecord( ) upon completion of work by EditName( ), state information about NewRecord( ) is saved on the stack 300 in a stack frame 306 associated with NewRecord( ). Additionally, the address where execution should continue upon return to NewRecord( ) is pushed onto the stack as a return address 310. Before EditName( ) begins executing, space may be allocated for its input parameters, local variables, and other data, on a stack frame 304 associated with EditName( ). In this way, a chain of procedures may call other procedures, and state information and return addresses are saved on the stack for each procedure in the call chain. This call chain information may be valuable for debug, profiling, optimization, and other reasons. Assuming this program with the chain of calling procedures is interrupted when EditName( ) is executing, the described forward walking stack walker returns the call chain return addresses 312, 310, along with the instruction address where EditName( ) was interrupted. Call chains may have hundreds of stack frames and corresponding return addresses.

Figure 4:
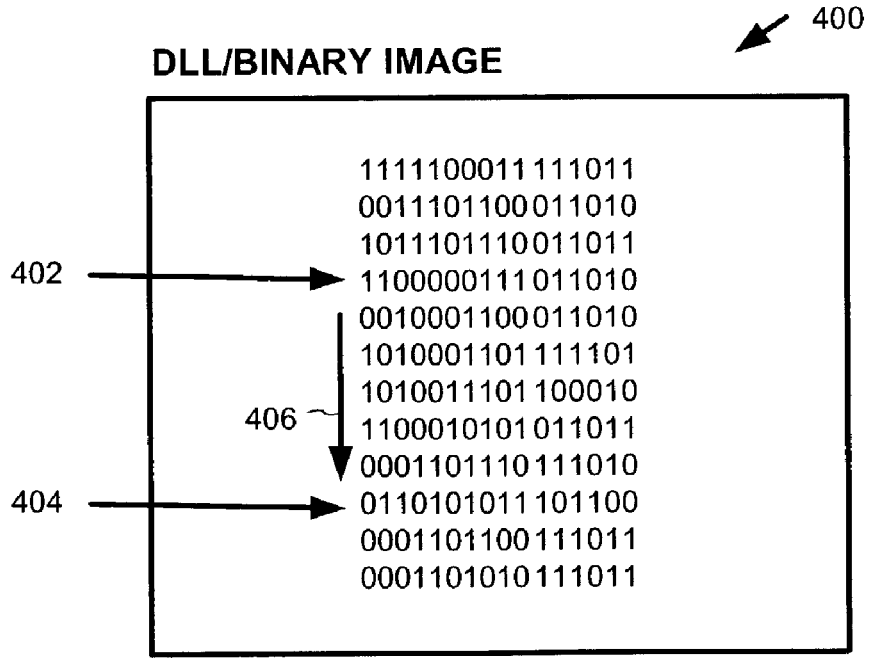
FIG. 4 is a diagram of a binary image being searched through one path of the control flow from an instruction pointer to a return instruction.

Upon an interrupt, a stack pointer 204 and an instruction pointer 206 is saved from the CPU 200 registers 202. As shown in FIG. 3, the stack pointer 302 points to the memory location of the top of the stack 300 at the moment the program was interrupted. As shown in FIG. 4, the instruction pointer 402 points to the memory location where the binary image 400 of the interrupted program is located (e.g., a DLL or other binary image for the interrupted procedure). A frame pointer 208 may also be obtained from a register, but the register that normally contains the frame pointer, may not be used as a frame pointer, if some optimization has been employed. Thus, although the frame pointer may be obtained, and possibly used, it is not assumed to be a pointer to the activated frame base.

Give these three inputs (i.e., a stack pointer, an instruction pointer, and a possibly useful frame pointer), an illustrated stack walker, returns a call chain of return addresses reflective of the stack state at the time of the interrupt. Specifically, these three inputs are used to identify the previous stack frame (i.e., the stack frame associated with the calling procedure), which in turn is used to identify its previous stack frame, until the return addresses for each calling procedure are obtained from the call stack for the interrupted program.

From where the instruction pointer points 402, to a return address in the binary image 404, the illustrated embodiment walks forward through the binary image and calculates how the procedure would affect the activated frame 304, had the program executing the procedure not been interrupted. The process walks forward through the binary image by disassembling instructions downward 406, one instruction after another, while following the control flow. Walking forward means to treat each instruction sequentially in the direction of process execution 406, as opposed to walking backward through previously executed instructions. The disassembly involves determining from the binary image, an instruction that the binary image represents, and seeing how that instruction will treat the stack. Following control flow means taking branches that may have been taken had the binary image actually been executing. So disassembling downward includes following branches in control flow. Although branches are followed in control flow, procedure calls are not followed, since the procedure call would activate another stack frame. In another embodiment, procedure calls could be followed, which would provide information about stack frames that the interrupted program would have activated in the future.

The control flow is followed until a return instruction is found in the binary image. While following the control flow, instructions are encountered. In one embodiment, these instructions are analyzed in order to determine how, or whether, they are using the frame pointer. For example, if a frame pointer is used with an offset to access a variable in the activated frame, then we know the frame pointer is active in this procedure. If the list of instructions use the frame pointer, then eventually the instructions will set the stack pointer equal to the frame pointer. Otherwise, the list of instructions may add a constant onto the stack pointer in order to determine where to go next.

If the interrupt had not occurred, control flow would have arrived at the return instruction 404, which would have popped the activated frame 304 off the stack, and returned to the calling frame 306. By walking forward through the control flow, the stack walker calculates where the interrupted program or thread would have ended up had it continued without interruption. The forward walking stack walker, examines each successive stack frame 304, in order to determine its calling stack frame 306. Further, once the previous stack frame is identified 306, the same technique is utilized to determine its calling stack frame 308.

Once the return 404 is encountered in the binary image 400, some of the instructions in the control flow 406, are used to help find a return address in the stack. The purpose is to find the return address to the calling procedure's binary image. This return address becomes the new instruction pointer, and the calling procedures binary image is walked to find a return instruction, and so on (e.g., see FIG. 14 and its accompanying discussion). At this point, the method has the new instruction pointer, a new stack pointer 314, and a new binary image (not shown) pointed to by the new instruction pointer 310. These new inputs are utilized by the forward stack walker to walk the calling stack frame 306. The stack walker then utilizes the same process to obtain the return address for the next stack frame 312, and then, each successive stack frame, until the bottom of the program stack (or thread stack) is reached. The output is a list of return addresses 310, 312 from the call chain representing the calling procedures (e.g., Main( ), NewRecord( )).

When walking forward 406 through each successive binary image 400 pointed to by the first instruction pointer and subsequently by each successive return address 310, 312, each successive instruction in the control flow is examined to identify instructions that affect the pointers on the stack. For example, an instruction that just changes a local variable 316 on the stack may not affect the stack state, and thus can be ignored. Thus for a given processor, a series of instructions are identified that affect the call stack, and those effects are tracked in order to walk up the stack and identify each successive return address. This list of return address are returned as the call chain output from the stack walker. This forward stack walking method is best understood in the context of a specific implementation, but once this implementation is discussed, adapting the forward stack walking method to any processor's instruction set, will be apparent to those skilled in the arts.

Figure 5:
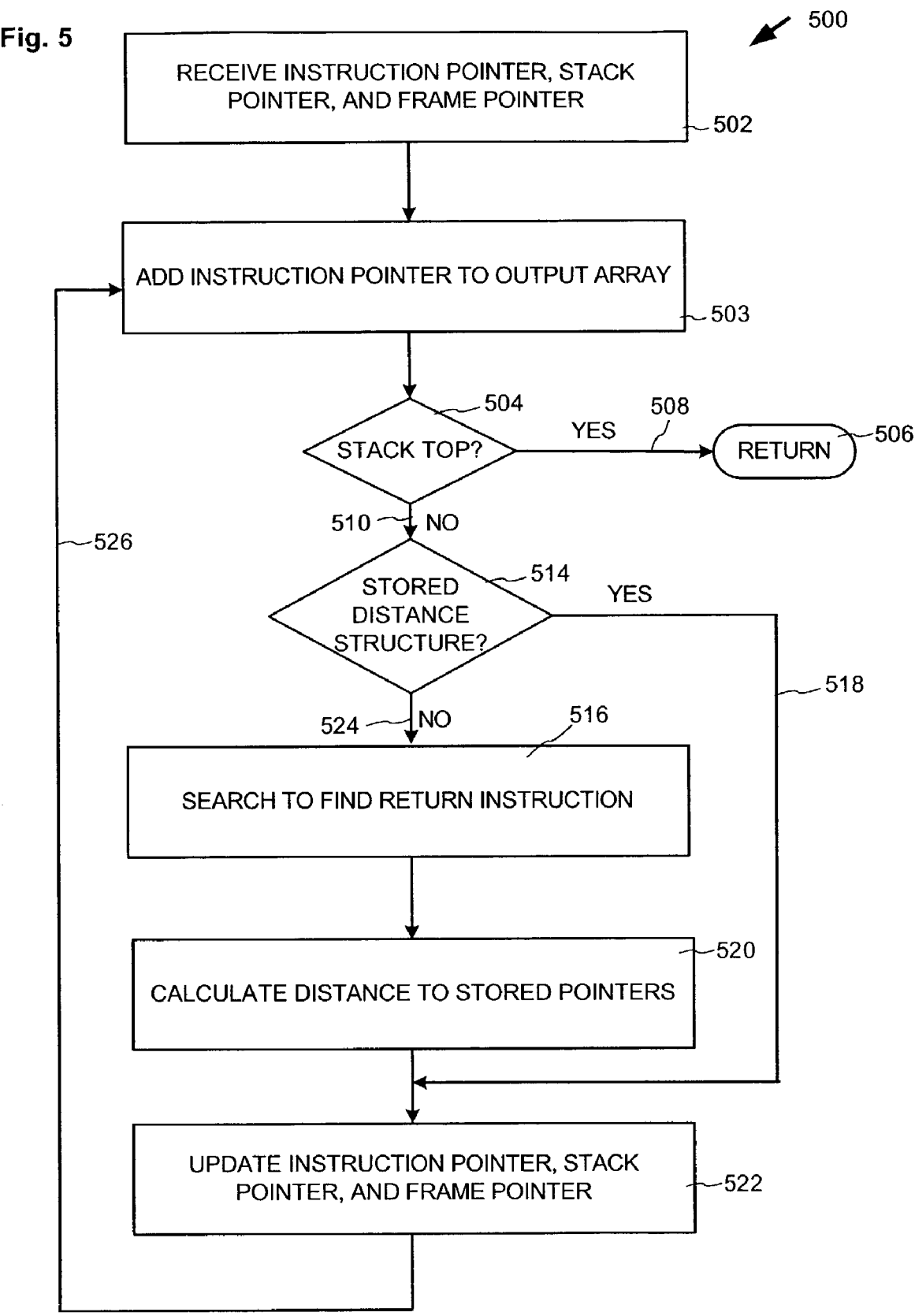
FIG. 5 is a flow chart of a method for forward walking through successive binary images to obtain the call chain for a given program.

FIG. 5 is a method 500 of forward walking through successive binary images to obtain the call chain for a given program. The method receives 502 as inputs, the instruction register content (instruction pointer), the stack register content (stack pointer), and the frame register content (possibly a frame pointer). These inputs represent the CPU register contents at the moment the program was interrupted. Since the output of the stack walking method is the return addresses from the stack frames (e.g., 310, 312, etc.), in this embodiment, an output array holds these return addresses (not shown). The input instruction pointer 502 is the first element of the array since it identifies the binary image of the procedure interrupted. As each return address is identified while walking the stack, it will be added to the output array 503, and the array will be the output from the stack walking routine. Thus, the first element in the output array is the given instruction pointer, and each subsequent element is typically the address of an instruction following the call instruction. For normal compiled code, it will most likely be the instruction after the call instruction, because that is typically the return address from the call. Of course, other data structures known in the arts could store the return address information representing the call chain (e.g., a link list). It may not be necessary to have an output array of more than 1000 elements.

The method 500 next determines whether or not the call stack is empty 504. It is possible that immediately upon the interrupt, the stack pointer points to an address value that is considered an empty stack 508. In that case, the output array contains only the instruction pointer received as input to the stack walker, and the stack walker returns 506 the output array. From this output array, it is apparent that only one procedure was in the call chain. In another embodiment, an operating system may provide an API that is used to determine whether or not the interrupted program has a call chain. One such API retrieves the start address of the interrupted program. If the instruction pointer, at time of interrupt, can be reached from the start address through control flow, without calling another procedure in the program, then the method completes 508, and the returned output array 506 contains the call chain. This embodiment assumes that, if you can reach the input instruction pointer address through any control flow, without calling another procedure in the program, then there is no call stack. This "reach-ability" control flow search from the programs start address to the input instruction pointer, is similar to the "breadth-first-search" discussed below to find a return instruction. If the stack is not empty, and or, the input instruction pointer is not reachable from the program start address, then there are stack frames containing return addresses that need to be identified.

More typically, the stack will not be empty 510. In such a case, there may be several (or hundreds) of stack frames that need to be walked in order to obtain the return addresses of the call chain. So long as return addresses remain on the stack 510, the stack walking continues. Once the stack is empty 508, or no return addresses remain on the stack 508, the output array contains the call chain 506.

Figure 27:
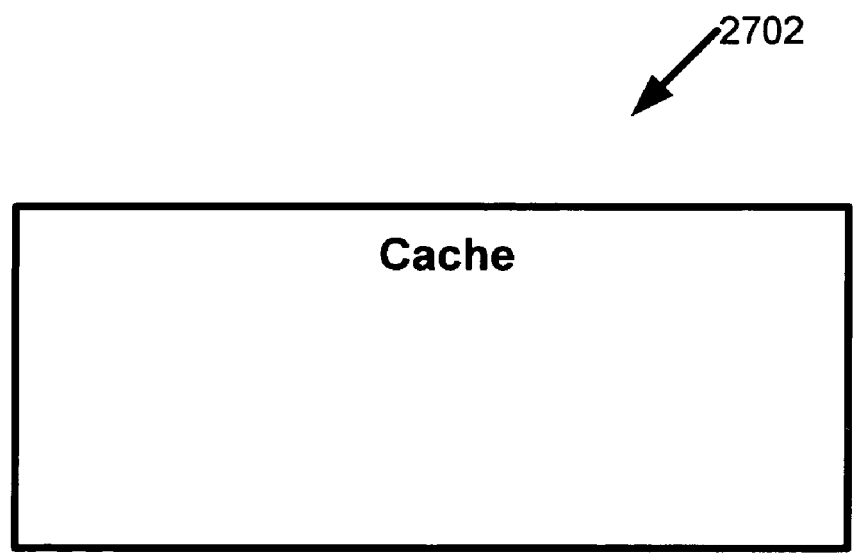
FIG. 27 is a block diagram of an exemplary cache of distance structures associated with instruction pointers.

If the stack is not empty 510, then the instruction pointer is compared to a list of instruction pointers, in order to determine whether or not a distance structure has been computed for this instruction pointer 514. Distance structures will be further discussed in relation to FIG. 6. In this implementation, a cache of 2702 distance structures are saved and associated with instruction pointers as an optimization, as shown in FIG. 27. This optimization can be used, for example, with a profiler which may walk the stack multiple times. Thus, the method must determine 514 whether or not a distance structure has been computed for this instruction pointer. If a distance structure has already been computed for an instruction pointer 518, then the distance structure can be used to update the instruction pointer, stack pointer, and frame pointer 522, as discussed below in relation to FIG. 10.

If the distance structure has not yet been computed 524 for this instruction pointer, then a "breadth-first-search" (BFS) is used to find a return instruction 516. As discussed in FIG. 4, for each binary image associated with each procedure in the call chain, the instruction pointer, points to an instruction 402 in the binary image. The BFS search finds a return instruction 404 in the binary image. The BFS is used since it quickly identifies any return instruction in the binary image. The BFS finds the shortest path to a return instruction that contains the fewest number of indirect calls. Indirect calls are call instructions whose target is in a register or a memory location. A direct call has a target that is encoded within the call instruction. Following a path through direct calls is quicker. So as not to obscure the present discussion, an example BFS search, comparing "Shortest Path" with "Shortest Path with Fewest Indirect Calls" is discussed in association with FIG. 16. The BFS algorithm uses the control flow to search through the instructions. Some instructions simply fall-through to the next instruction while other instructions (e.g., a JMP instruction) indicate a target instruction. Other instructions (e.g., a conditional branch instruction) have both a target instruction and a fall-through instruction. In general, a dissembler (i.e., a program that converts machine language into assembly language) is used to determine the control flow of an instruction. The BFS algorithm can use either the target and or a fall-through to find the shortest path. In this embodiment, once any return instruction is found, the BFS search is completed. Since any return instruction can be utilized in this method, any search method can be used. For example, a depth-first-search could also be used to find a return instruction in any possible control flow path. But over many searches, a BFS will likely save time. In one embodiment, a limit is set on the number of instructions searched to find a return instruction (e.g., 5000 search instructions). Using a search, a path of instructions from the instruction pointer to the return instruction is identified 516.

After the return instruction and the path of instructions to the return instruction is identified 516, the path of instructions is used to calculate distance variables 520. An example data structure for referencing distance variables (e.g., a distance structure) is discussed in association with FIG. 6, and a distance structure calculation is discussed in association with FIG. 7.

After a distance structure has been calculated for this stack frame, the calculated distance structure is used to update the instruction pointer, stack pointer and frame pointer 522. The new instruction pointer is added to the output array 503, before returning to check whether or not the stack is empty yet 504.

Thus, the method 500 is used to determine a return address to each calling procedure. That return address is the input instruction pointer used to begin a BFS search of the calling procedure. This continues 526 until the stack is empty 508. Upon completion, an output array 506 contains return addresses.

As shown in FIG. 6, a data structure 600 called the distance structure contains six variables. The variables are the instruction pointer distance 602 ("IPDist"), the stack pointer distance 604 ("SPDist"), the frame pointer distance 606 ("FPDist"), a boolean value called "is-the-frame-pointer-relative" 608 ("IsFPRel"), a boolean value called "the-procedure-updates-the-frame-pointer" 610 ("UpDatesFP"), and a counter value of Unknowns 612 ("Unknowns"). Upon first entry into calculating the distance structure 520, the distance structure 600 variables (IPDist, SPDist, FPDist, IsFPRel, UpDatesFP, Unknowns) are initialized, respectively, as shown 614–624 (0, 0, 0, false, false, 0).

In FIG. 5, the method calculated the distance to stored pointers 520 for the present stack frame. FIG. 7, and its accompanying discussion explains how the distance structure is calculated to determine the distance to the stored pointers. Each instruction found in the instruction path during the BFS search, may potentially be used to compute the distance structure. However, since most instructions are not helpful in identifying a calling procedure's return address or stack pointer, or in determining whether the stack frame is using frame-pointer-relative-addressing, they are ignored in computing the distance structure. FIG. 7 is a list of instructions (e.g., Intel X86) and corresponding modifications that compute the distance structure in this implementation. Of course, implementations will vary slightly based on different computer architectures with different instruction sets. For each instruction in the instruction path, the instruction is compared to the list 700. If the instruction is on the list 702, then the corresponding function 704 is performed on the distance structure 600. For example, if a return instruction is encountered 706, then 4 bytes plus the return amount are added to the SPDist variable in the distance structure. How the distance structure is used to determine offsets to pointers in the call stack, will become apparent in the following discussion and figures.

Figure 8:
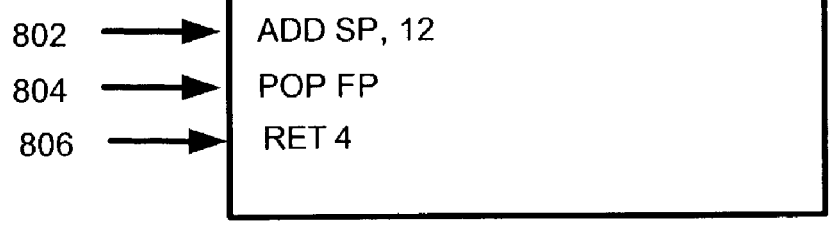
FIG. 8 is a path of instructions found in the control flow that are identifiable in FIG. 7.

FIG. 8 is an example instruction path 800. In the BFS search of the binary image (e.g., FIG. 4), a path of instructions corresponding to the list 702 are identified. Once this path of instructions are identified, a corresponding function 704, for each identified instruction is applied to the distance structure. Before calculating the distance structure 502, the distance structure is initialized with the described start state (0, 0, 0, false, false, 0). Each instruction is applied to the distance structure, for example, the first instruction 802 in the path 800, is applied to the distance structure. Since the "ADD SP, 12" instruction 802 is in the instruction list 706, the corresponding function 708 is applied to the distance structure. In this case, the corresponding function 708, sets the IPDist variable in the distance structure equal to the 12, which is the "value" parameter of the "ADD SP, 12" instruction. Thus the distance structure is changed from (0, 0, 0, false, false, 0) to (12, 0, 0, false, false, 0). For each instruction in the path 800, the corresponding function is applied to the distance structure. The next instruction "POP FP" 904, has a corresponding function 710 which changes three variables on the distance structure. Upon executing the function 710, the distance structure changes from (12, 0, 0, false, false, 0) to (4, 0, 12, false, true, 0). The final instruction in this path "RET 4" 806, has a corresponding function 712, that changes the distance structure from (4, 0, 12, false, true, 0) to (4, 8, 12, false, true, 0). Since all path instructions were applied to the distance structure, the calculation of the distance structure 520 is complete. The next step is to update the instruction pointer, stack pointer, and frame pointer 522. In the calculated distance structure, the variable "IsFPRel" is false. This means that the method 520 has determined that frame pointer relative addressing is not being utilized in this stack frame. In another embodiment, each instruction in the BFS search that fits the list 702, could be applied to the distance structure as they are encountered, instead of making a list of path instructions 800 and then applying the list as discussed here.

Figure 9:
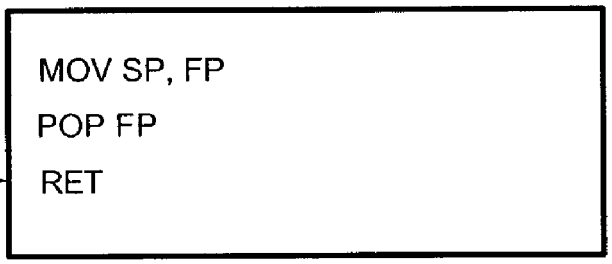
FIG. 9 is a path of instructions found in the control flow that are identifiable in FIG. 7.

FIG. 9 is another example instruction path 900. In the BFS search of the binary image (e.g., FIG. 4), a path of instructions in the list 702 are identified. Again, the distance structure is initialized (0, 0, 0, false, false, 0) before the calculation begins 520. Then the first instruction 902 in the path 900, is applied to the distance structure. Since the "MOV SP, FP" instruction 902 is in the instruction list 714, the corresponding function 716 is applied to the distance structure. In this case, the corresponding function 716, the distance structure is changed from (0, 0, 0, false, false, 0) to (0, 0, 0, true, false, 0). For each instruction in the path 900, the corresponding function 704 is applied to the distance structure. The next instruction "POP FP" 904, has a corresponding function 710 which changes three variables on the distance structure. Upon executing the function 710, the distance structure changes from (0, 0, 0, true, false, 0) to (4, 0, 0, true, true, 0). The final instruction in this path "RET" 906, has a corresponding function 712, that changes the distance structure from (4, 0, 0, true, true, 0) to (4, 4, 0, true, true, 0). Since all path instructions were applied to the distance structure, and calculation of the distance structure 520 is complete, the next step is to update the instruction pointer, stack pointer, and frame pointer 522. This time, the calculated variable "IsFPRel" is true. This means that the method 520 has determined that frame-pointer-relative-addressing is being utilized in this stack frame. Thus, the method takes advantage of frame pointers to walk the stack when they are available, but can walk the stack without frame pointers. More examples of how instructions paths are applied to distance structures are discussed in association with FIGS. 17, 19–20, and 23–24. However at this time, the discussion turns to how the distance structure is subsequently used to update the instruction pointer, stack pointer, and possibly the frame pointer 522.

Once the distance structure has been calculated according to FIG. 7, it contains the variables 600 updated based on the instruction path found in the BFS for the present procedure's binary image. These variables are then used to determine the stack pointer to this procedures calling procedure, and the instruction pointer (return address) to the calling procedures binary image. The distance structure is used to update the previous instruction pointer, stack pointer, and possibly frame pointer, so they can be used to walk the stack frame of the procedure calling this procedure. While the distance structure is usually valid for a range of instruction addresses, the illustrated embodiment, does not take advantage of that optimization. For example, when the binary image is first examined at the instruction pointer (e.g., 402), there may be many instructions above it or below it that do not affect the distance structure (e.g., instructions not in the list 702). In another example, the series of instructions that do affect the distance structure may be located in the control flow regardless of which path is taken through the binary image. In either case, an optimization would entail including this range of instructions that do not affect the distance structure. For example, at step 514 above, a range of instruction pointer addresses that do not alter the distance structure, could point to the same distance structure.

As shown in FIG. 10, once a distance structure is computed 520, a series of instructions 1000 are used to update the stack pointer, instruction pointer, and possibly the frame pointer 522, before returning 526 to start over again. As previously stated, a stack pointer, instruction pointer, and frame pointer are received 502 upon entry into the stack walker 500. After completion of the method 500, the stack pointer, instruction pointer, and possibly the frame pointer are updated 522. The computed distance structure 520 and the instructions 1000 in FIG. 10 are used to update 522 the stack pointer, instruction pointer, and possibly the frame pointer.

Before describing how the instructions 1000 are used to update the stack pointer, instruction pointer and frame pointer, two additional data structures are described. FIG. 11 is a data structure 1100 used to hold the old stack pointer, instruction pointer, and frame pointer ("OldDS"), and FIG. 12 is a data structure 1200 used to store the new stack pointer, instruction pointer and frame pointer ("NewDS"). In the first iteration through the stalking walking method 500, we have the stack pointer, instruction pointer, and possible the frame pointer, which are inputs to the stack walker. Thus, after calculating a distance structure, the distance structure contents are used to compute the new stack pointer, instruction pointer, and frame pointer. Each time a distance structure is computed, it is used to compute a NewDS (stack pointer, instruction pointer, and possibly a frame pointer). Each time a NewDS enters the method 502, or re-enters the method 526, it is the NewDS. Yet, when that NewDS is subsequently used with the distance structure to update the stack pointer, instruction pointer, and possibly a frame pointer 522, that NewDS is renamed the OldDS, right before the update 522.

In FIG. 10, the instructions 1000 update the new data structure 1200. This is illustrated with respect to the example stack 1300 shown in FIG. 13, along with the distance structure computed above (4, 8, 12, false, true, 0). For easy reference in this paragraph, the reference-value pairs for the distance structure are as follows: (IPDist=4, SPDist=8, FPDist=12, IsFPRel=false, UpDatesFP=true, Unknowns=0) In this example, the OldDS contains the values that were the original input into the stack walker 502, or the updated values 522 from the last return 526 to the stack walker. The distance structure was computed 520, and next, the NewDS values are updated 522. Assume the old stack pointer 1302 points to the stack at memory location CE2C. The distance structure (e.g., (4, 8, 12, false, true, 0)) indicates that frame-pointer-relative-addressing is not being used ("IsFPRel=false"), so the first instruction 1002 is skipped. The next instruction 1004 sets the NewDS.StackPointer equal to the OldDS.StackPointer plus the FPDist distance. Now the stack pointer points 1304 at memory location CE38 which contains the "Frame Address=D." The next instruction 1006 points the NewDS.FramePointer to the address of the frame pointer for the calling procedure. The next instruction 1008 adds the IPDist to the NewDS.StackPointer, so now it points to the return address 1306 of the calling procedure. Since the NewDS.StackPointer now points to the return address of the calling procedure, NewDS.FramePointer is de-referenced 1010 to point to the binary image of the calling procedure. Finally, the stack is SPDist is added 1012 to the NewDS.StackPointer so it now points at 1308 memory location CE44.

Had Unknowns been encountered when the distance structure was computed 520, a "ReturnAddressFind( )" heuristic is now used 1014 to find a return address that is closest to the current stack pointer. A return address can be detected by 1) being within a binary image and 2) being immediately following the bytes that make up a call instruction. Once the heuristic is used, the distance structure's fields IPDist and FPDist fields are altered accordingly and the NewDS values are altered to reflect these changes. So as not to obscure the discussion here, an example Indirect Call which requires a heuristic to recover, is discussed later in association with FIG. 21 and 22.

Finally, the instruction pointer (return address) is added to the output array 503, before returning to see whether the stack is empty yet 504.

Figure 14:
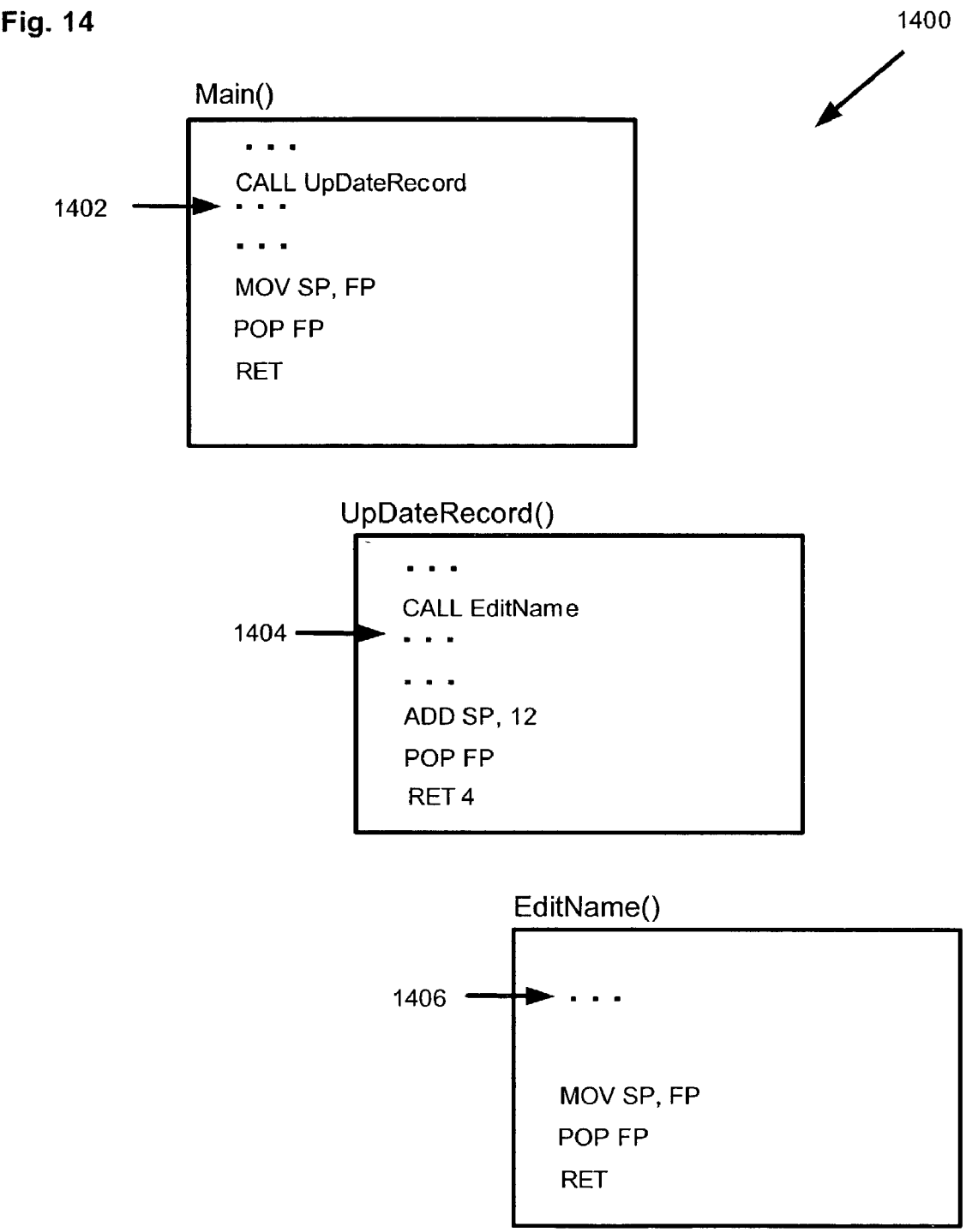
FIG. 14 is a diagram of a series of binary images illustrating how walking forward through binary images is used to walk back up the call stack.

FIG. 14 is an example call chain 1400 of an interrupted program. In this example 1400, the binary image of Main( ) calls the binary image of UpDateRecord( ), which calls the binary image of EditName( ). As an overview, the stack walker, returns an output array which includes the return address of the call chain 1406, 1404, 1402. The stack walker receives as input, the instruction pointer 1406 at the moment the EditName( ) procedure is interrupted. The stack walker walks forward through the binary image in EditName( ) and identifies the shortest path to the return instruction in EditName( ). These instructions are interesting because they provide information about how the stack frame associated with the EditName( ) procedure are affected. By walking forward through EditName( ) from the interrupted control instruction to the return address, and watching how the instructions treat the corresponding stack frame, the return address to the calling procedure (UpDateName( )) is identified in the call stack. The return address to the calling procedure is generally the instruction following the call instruction 1404. Once the instruction pointer to UpDateRecord is obtained 1404, the method begins again walking forward to any return instruction in UpDateRecord( ). Again, instructions affecting UpDateRecord( )'s corresponding stack frame, are used to identify the return address to Main( ) in the call stack. This method is repeated until the bottom of the call stack is obtained. A list of the return addresses are the output.

Figure 15:
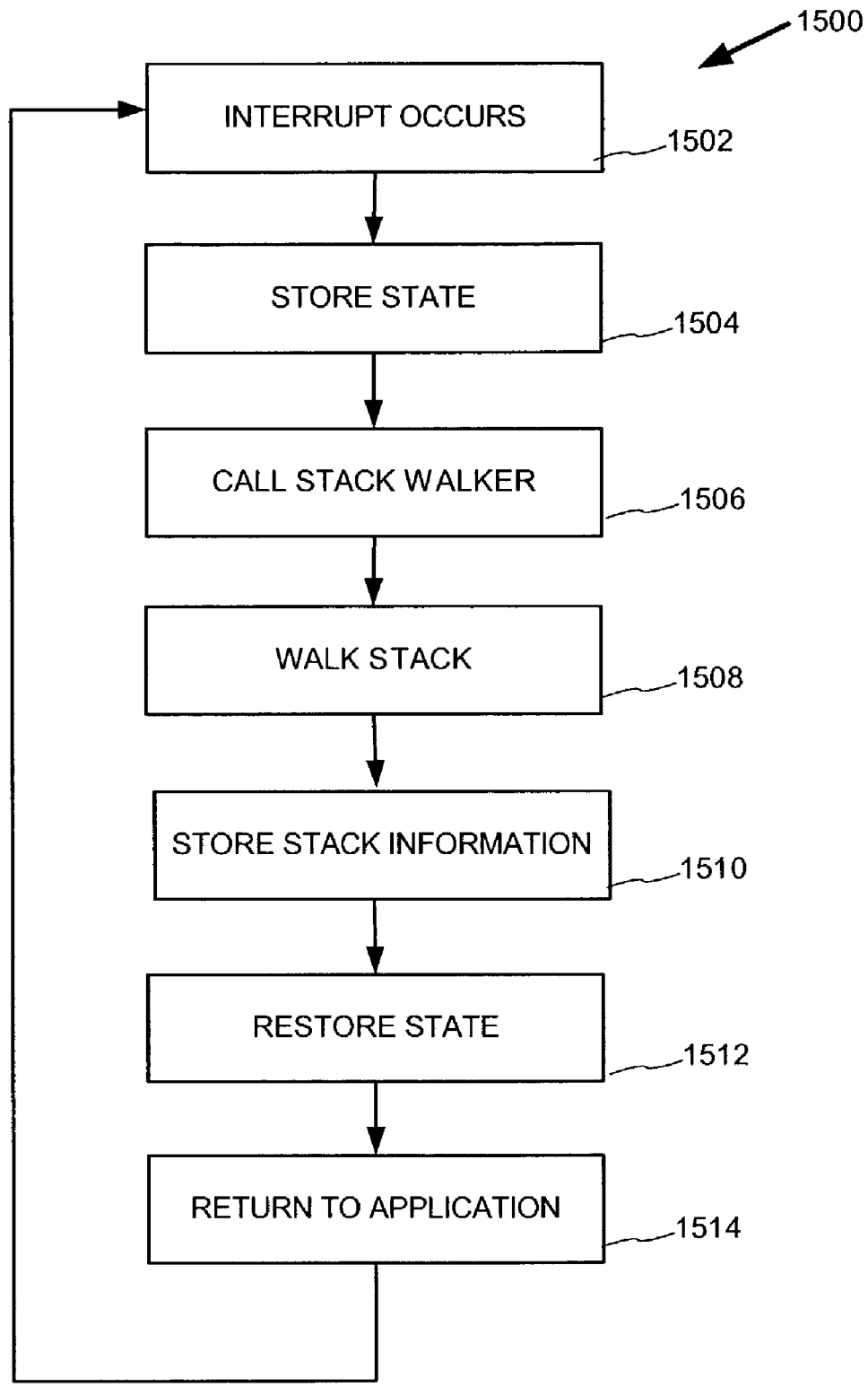
FIG. 15 is a flow chart showing how the stack walker is used by a profiler.

FIG. 15 represent an implementation of the stack walker in conjunction with a profiler or other invoking program. There are many reasons why a stack walker is valuable, and a profiler is just one. An application program under profile, may be interrupted 1502 for a number or reasons, using a number of methods (e.g., code injection, periodic interrupts, etc.). State information about the running application is saved 1504 so that when the stack walk is complete, the application can be restored and continue running after the interrupt. Not all programs calling a stack walker will want or need to restore the interrupted application. The stored information may include the CPU register contents, stack contents, and other information.

Next, the stack walker 500 is called 1506. Copies of the stack pointer, instruction pointer, and frame pointer, along with a copy of the interrupted stack is passed to the stack walker. As previously discussed, the stack walker walks the stack 1508 of the interrupted thread or program. The stack walker returns an array of instruction pointers which identify the call chain.

This call chain information is stored 1510 for further evaluation by the profiler. The output array of instruction pointers can be converted to a textual representation of the names of the called procedures if that is valuable. Such conversion procedures are known in the arts.

Next, the state information saved for the interrupted program is restored 1512, and program control is returned to the interrupted application 1514. One of the purposes of a profiler is to repeatedly interrupted a program under profile and collect data about the application. In this case, the profiler may perform another interrupt 1502.

Since a profiler that can attribute events to call stacks instead of just functions, a stack walker can greatly enhance the profiler's usefulness. Specifically, this stack walker is not limited by frame pointer optimizations and does not require debug information about stack frames. However, stack walking is not only helpful for a profiler, but is a core technology that can and is be used in many products. A stack walker can be used for example in resource leak detection. By walking the stack on resource allocation and keeping track of de-allocation one can find the function responsible for causing a resource leak (memory leak) within an application. It can also be used in failure injection. Since error-handling tends to be hierarchical it is usually only required to cause a function to fail only once for each unique call-stack in order to verify correct error handling code. Further, in crash dump analysis, some crashes require the call stack to understand the cause of the crash. While the crash might occur in function X the actual cause of the crash may be a function several levels above on the call stack. Stack Walking can also be used in debugging for the same reasons as in crash dump analysis.

FIG. 16 is an example breadth first search (BFS) finding a shortest path with the fewest Indirect Calls for a given binary image 1600. As previously mentioned (FIG. 5, item 516), in one implementation it is beneficial in a BFS search to locate a return instruction in a shortest path with the fewest number of Indirect calls. This is because direct calls typically involve fewer processing cycles. Again, indirect calls are typically call instructions whose target is in a register or a memory location, whereas direct calls have the target location encoded in the call instruction. For example, in a BFS search of an example binary image 1602 located at a given memory range 1604, a shortest path of instructions 1606, is compared to a shortest path of instructions with the fewest number of indirect calls 1608. In this example, although a shortest path of five instructions 1610 is available, it may not be selected if it occurs through an indirect call 1612 (e.g., Call Ecx is an indirect call in the x86 Architecture). In this example a BFS search to the first return instruction, with a fewest number of indirect calls 1608, will produce a return instruction in seven instructions 1614.

As promised earlier here are a few more examples of how to apply instructions encountered in a BFS search to a distance structure 600 using the functions 704 discussed in FIG. 7. FIG. 17 includes an example instruction path 1702 which includes a direct call 1704. Again, the distance structure is initialized to a start state 1706 ((IPDist, SPDist, FPDist, IsFPRel, UpDatesFP, Unknowns)=(0, 0, 0, F, F, 0)). The Push instruction 1708 is in the list of instructions 702 that transform the distance structure. As each instruction in the path of instructions 1702 is evaluated, the corresponding transformation of the distance structure 1710 is observed in the adjacent column. In this case the push instruction 718 has a corresponding function 720 that transforms the IPDist value 1712. This instruction path 1702 includes a direct call 722 to function Bar 1704. The target Bar is searched to find a return instruction 1714. The return instruction is found in Bar 1714, so the IPDist value is updated according to the function 722, as shown 1716. Next, the Add instruction 1718, 706, transforms the IPDist value 708, 1720. Next, the Pop base pointer instruction 1722, 724 (a base pointer is also known as a frame pointer), transforms 710 the UpDatesFP value, the FPDist value, and the IPDist value 1724. Finally, the Return instruction 1726, transforms 712 the SPDist value 1728. This calculated distance structure 1728, 520 is now ready to be used to update the instruction pointer, stack pointer, and frame pointer 522.

Figures 18, 19:
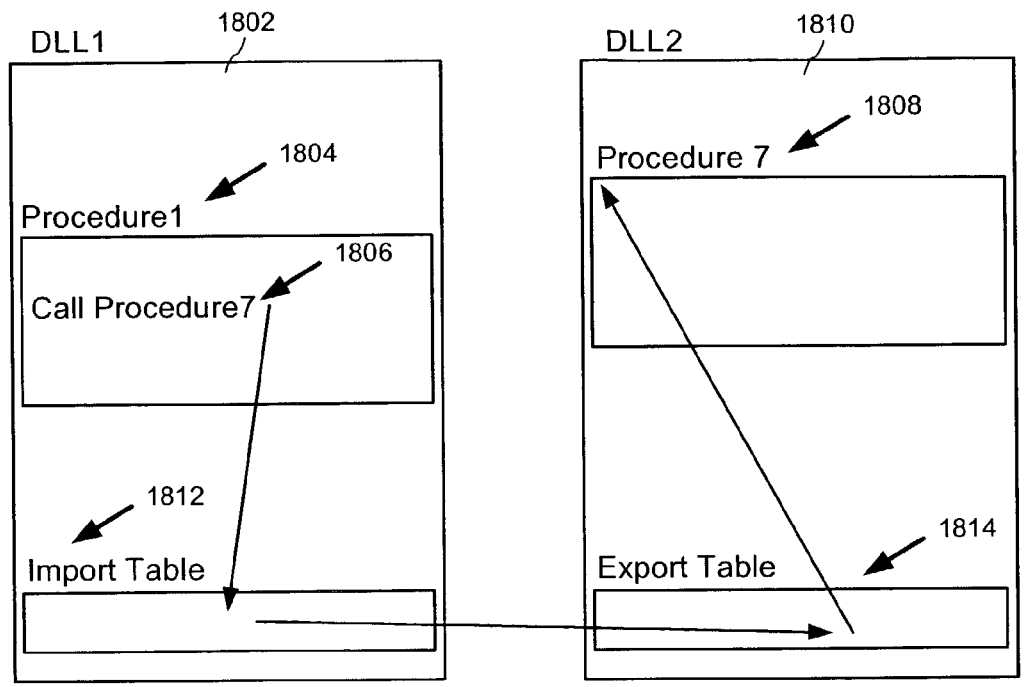
FIG. 18 is a diagram of two linked binary images including import and export tables.
FIG. 19 is a path of instructions found in the control flow and an accompanying distance structure transformation.

FIG. 18 represents a call relationship between two functions in separate dynamically linked libraries. In this example, a dynamic link library 1802 ("DLL1") contains a function 1804 ("Procedure1"), that contains an indirect call instruction to a function 1808 ("Procedure7") in another dynamic link library 1810 ("DLL2"). In this example, since the call is an indirect call using an imported function call 726, the method calculates the target using rules that govern import-export tables. In this case, it is determined that the import table 1812 contains a linked reference to an export table 1814 in a linked dynamic library 1810. The method uses this link 1812, 1814, and then treats the indirect call as a direct call 722. Thus, a return instruction is found in the linked function 1808, and this is used to compute the IPDist value 722. An example instruction path following this relationship is shown in FIG. 19.

FIG. 19 includes an example instruction path 1902 which includes an indirect call 1904. As shown in FIG. 19, Procedure 1 contains an instruction path which includes a an indirect call 1904. Again, the distance structure is initialized to a start state 1908 ((IPDist, SPDist, FPDist, IsFPRel, UpDatesFP, Unknowns)=(0, 0, 0, F, F, 0)). As each instruction in the path of instructions 1902 is evaluated, the corresponding transformation of the distance structure 1912 is observed in the adjacent column. In this case the push instruction 1910 has a corresponding function 720 that transforms the IPDist value 1914. Next, the instruction path includes a subtract stack pointer instruction 1916, and the corresponding function transforms the IPDist value as shown 1918. The distance structure is transformed as shown until the indirect call 1806 is reached in Procedure 1. This instruction path 1902 includes an indirect call 1904 to Procedure 7 1808. Since this indirect call has a linked call exposed in the import-export tables 1812, 1814, it is treated 726, as a direct call. Thus, the target function Procedure 7 is searched to find a return instruction 722. The return instruction is found in Procedure 7 1920, so the IPDist value is updated according to the function 722, as shown 1922. The balance of the transformation 1912 is uneventful, and the calculated distance structure 1924, 520 is now ready to be used to update the instruction pointer, stack pointer, and frame pointer 522.

FIGS. 20, 21, and 22 represent an example of how a heuristic (e.g., "ReturnAddressFind") is used to find a return address that is closest to the current stack pointer. FIG. 20 is path of instructions found while conducting a BFS search of a function ("ProcedureA"), and the associated transformation of a distance structure 2004. As shown a push instruction 2006 transforms the distance structure 720 as shown 2008. However, the next instruction 2010 is a call to an address located in the "ecx" register. In order to compute this indirect call instruction, the target must be searched for a return instruction 726. However, the contents of the "ecx" register are not available. In this case, the import export tables are not available to resolve this indirect call 726, so the "Unknown" value in the data structure is incremented according to the corresponding indirect call function 726 (Unknowns++), as shown 2012. Finally, the return instruction 2014, transforms the distance structure 712 as shown 2016, and the calculated distance structure 520 is now ready to be used to update the instruction pointer, stack pointer, and frame pointer 522. In this case, since Unknowns is not equal to zero 2016, the heuristic "ReturnAddressFind( )" is called 1014 (FIG. 10). Thus, the distance structure is first computed 2016 (i.e., (−4, 8, 0, F, F, 1)), however, the new instruction pointer, stack pointer, and frame pointer subsequently created 522, 1000, are likely to be incorrect since they didn't account for the indirect call 2010, 2012. This would not have been a problem if the indirect call had no parameters or if a procedure used the frame pointer. However, in this case, because the indirect call takes parameters and the frame pointer has been optimized away, the instruction pointer, stack pointer, and frame pointer are incorrect. This analysis continues in view of the call stack shown in FIG. 21.

FIG. 21 is a call stack 2100 showing the stack frame 2102 for ProcedureA, and the partial parameters for the call to an unknown "ecx" stack frame 2104. As shown with the computed distance structure (−4, 8, 0, F, F, 1), it appears that the calculated IPDist (−4) is off by 8 bytes from the adjustment needed to reach the return address 2110 in the ProcedureA stack frame. This can be determined using the following heuristic. The stack 2100 is examined for values that meet the following criteria: (1) the value on the stack, if treated as an address would exist within a binary image, and then (2) that binary image is examined in order to determine whether the bytes in that binary image immediately before the return address, could be a call instruction. Thus, if a stack value seems to be a return value, then the binary image it points to, is examined to see if the instructions before the return address represent a call instruction. For example, FIG. 22 is an exemplary binary image 2200. After a return address that exists in a binary image is found on the call stack 2106, that binary image 2200 is examined at the return address 2202. To determine if this address 2202 could be from a direct call, look at the bytes before it. For direct calls, and a given architecture, a certain number of bytes before the return instruction (e.g., five bytes in the x86 architectures), a direct call instruction should correspond to the direct call opcode (e.g., 0xe8 for an x86 architecture). For indirect calls, and a given architecture, a certain number of bytes before the return instruction (e.g., 2–7 bytes in the x86 architectures), an indirect call instruction should correspond to the indirect call opcode (e.g., 0xFF for an x86 architecture). Once the return address is verified in the binary image where it points, this is used as the valid return address. However, if multiple stack values (not shown) appear to be valid return address values, then the values (e.g., the return address) closest in proximity to the values obtained in the distance structure (i.e., (−4, 8, 0, F, F, 1)) is used.

FIG. 23 includes an example instruction path 2302 which includes a Leave instruction 2304. Again, the distance structure is initialized to a start state 2306 ((IPDist, SPDist, FPDist, IsFPRel, UpDatesFP, Unknowns)=(0, 0, 0, F, F, 0). As each instruction in the path of instructions 2302 is evaluated, the corresponding transformation of the distance structure 2310 is observed in the adjacent column. In this case the Sub instruction 2308, 734 has a corresponding function 728 that transforms the IPDist value as shown 2312. The Leave instruction 2304, 730 transforms IsFPRel value, the UpDatesFP value, the FPDist value, and the IPDist value, as shown in 2314. Finally, the return instruction 2316 transforms the SPDist value as shown 2318. This calculated distance structure 2318, 520 is now ready to be used to update the instruction pointer, stack pointer, and frame pointer 522.

FIG. 24 includes an example instruction path 2402 which includes a Mov instruction 2404 combined with a Pop instruction 2406 which create the same results 2420, 2318 combined as the Leave instruction shown in FIG. 23. Again, the distance structure is initialized to a start state 2408 ((IPDist, SPDist, FPDist, IsFPRel, UpDatesFP, Unknowns)= (0, 0, 0, F, F, 0). In this case the Sub instruction 2410, 734 has a corresponding function 728 that transforms the IPDist value as shown 2412. The Mov instruction 2404 has a corresponding function 716, that transforms the IsFPRel value, the FPDist value, and the IPDist value, as shown 2414. The Pop instruction 2406 has a corresponding function 724, that transforms the UpDatesFP value, the FPDist value, and the IPDist value, as shown 2416. Finally, the return instruction 2418 transforms the SPDist value as shown 2420. This calculated distance structure 2420, 520 is now ready to be used to update the instruction pointer, stack pointer, and frame pointer 522.

FIG. 25 is an example instruction path that may occur for example when a program does not end on its own. For example, in some game consoles (e.g., XBOX®, from Microsoft Corporation), the program terminates when the power turns off. An example segment of code may appear as shown in FIG. 25. Since the BFS search follows the control flow, it will never find the return instruction 2502, because control is returned 2504, and never falls through. In some cases, the compiler will even optimize away a return instruction 2502 when control flow never reaches it. In this case, if the BFS fails to reach a return instruction in a function called in a direct or indirect call, the heuristic described above is employed.

Figure 26:
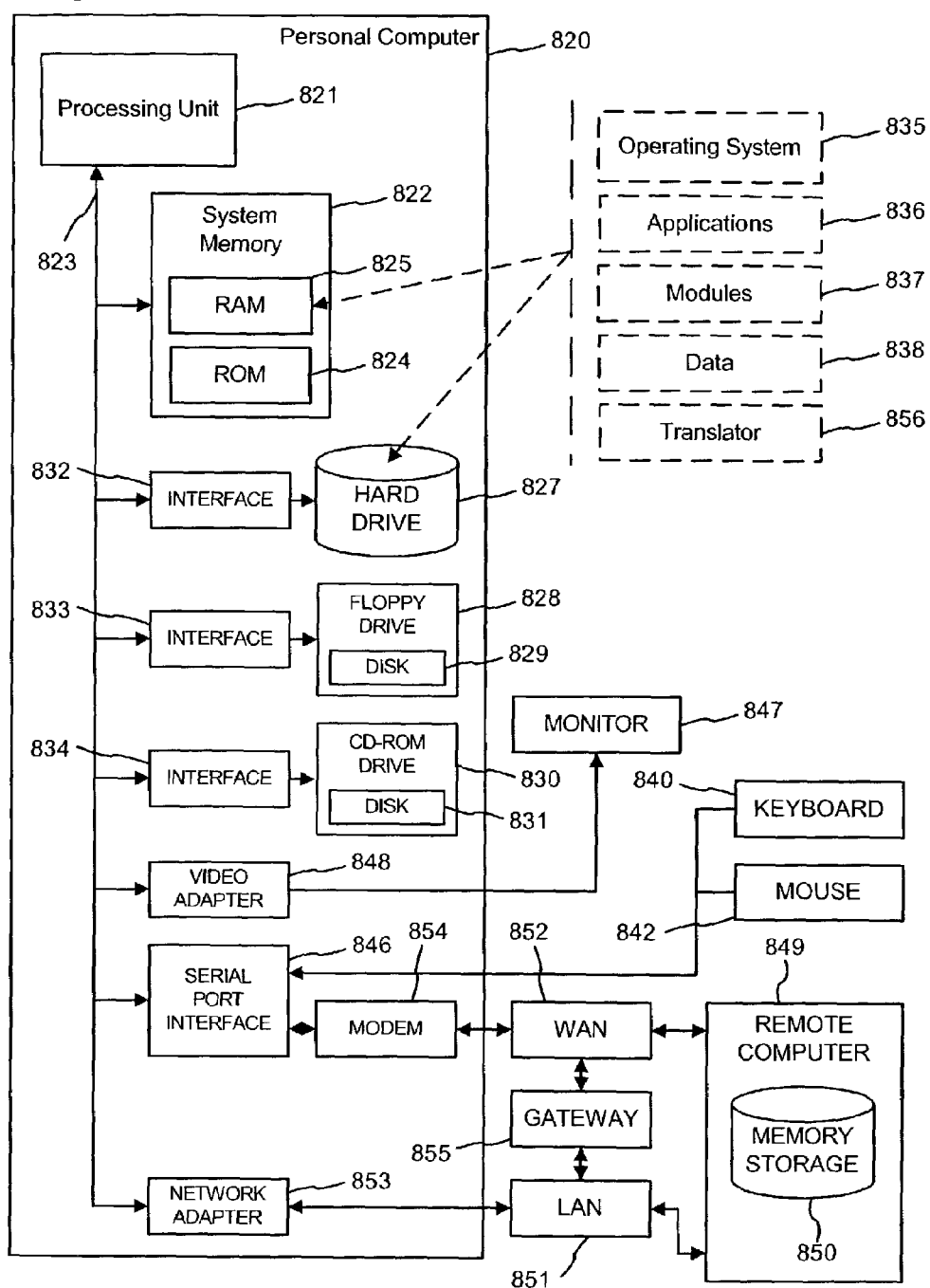
FIG. 26 is a block diagram of a computer system that may be used to implement a method, apparatus, and system embodying the described stack walker.

FIG. 26 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 26, an exemplary system for implementation includes a conventional computer 820 (such as personal computers, laptops, servers, mainframes, and other variety computers) includes a processing unit 821, a system memory 822, and a system bus 823 that couples various system components including the system memory to the processing unit 821. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 821.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 825, including an operating system 835, one or more application programs 836, other program modules 837, and program data 838; in addition to an implementation 856.

A user may enter commands and information into the computer 820 through a keyboard 840 and pointing device, such as a mouse 842. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 operates in a networked environment using logical connections to one or more remote computers, such as a remote computer 849. The remote computer 849 may be a server, a router, a peer device or other common network node, and typically includes many or all of the elements described relative to the computer 820, although only a memory storage device 850 has been illustrated. The logical connections depicted include a local area network (LAN) 851 and a wide area network (WAN) 852. Such networking environments are commonplace in offices, enterprise-wide computer networks, intranets and the Internet.

When used in a LAN networking environment, the computer 820 is connected to the local network 851 through a network interface or adapter 853. When used in a WAN networking environment, the computer 820 typically includes a modem 854 or other means for establishing communications (e.g., via the LAN 851 and a gateway or proxy server 855) over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing a communications link between the computers may be used.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

I claim:

1. A computer implemented method for identifying a call chain in an interrupted program, the method comprising:
   receiving a state of the interrupted program comprising a call stack, a stack pointer, and an instruction pointer;
   while the call stack still contains return addresses, performing the following:
   following the control flow in a binary image of the interrupted program, from the instruction pointer, through a path of instructions, to a return instruction,
   selecting calculations for the offsets into the call stack to perform on distance variables based on instructions identified in the path of instructions,
   performing the selected calculations on the distance variables,
   using the calculated distance variables to update the instruction pointer and stack pointer; and
   returning a list of instruction pointers comprising the call chain of the interrupted program.

2. The computer implemented method of claim 1 wherein a cache of instruction pointers are stored, each associated with its calculated distance variables.

3. The computer implemented method of claim 2, wherein upon determining that an instruction pointer has associated distance variables, using the associated distance variables to update the instruction pointer and stack pointer.

4. The computer implemented method of claim 1 periodically called from a profiler to obtain multiple call chains.

5. The computer implemented method of claim 1 wherein said following the control flow through the binary image involves a breadth-first-search.

6. The computer implemented method of claim 1 comprising while following the control flow, identifying a range of instructions in the binary image that do not require any calculation on the distance variables.

7. The computer implemented method of claim 6 further comprising:
   associating the range of instructions with the same distance variables associated with an instruction that does require calculations on the distance variables; and
   updating the instruction pointer and stack pointer with those same distance variables for a return address subsequently encountered in the range.

8. The computer implemented method of claim 1 wherein the returned list of instruction pointers are converted to procedure names and presented in a graphical user interface.

9. The computer implemented method of claim 1 wherein the distance variables include a boolean variable that indicates that a binary image is using frame-pointer-relative addressing.

10. The computer implemented method of claim 1 called by a crash dump analysis program.

11. A computer implemented profiler program performing a method comprising:
   interrupting a running process and calling the computer implemented method of claim 1 with the state of the interrupted process; and receiving the list of instruction pointers.

12. The computer implemented method of claim 1, wherein the distance variables are stored in a data structure comprising a instruction pointer offset value and a stack pointer offset value.

13. The computer implemented method of claim 12, wherein the data structure further comprises a frame pointer offset value and a data value indicating when frame pointer relative addressing is used in the path of instruction.

14. A computer implemented method comprising:
   forward walking through the control flow of instructions of an interrupted process;
   identifying instructions in the control flow that change the size of a call stack for the interrupted process;
   calculating offsets into the call stack based on the identified instructions; and
   identifying a return instruction in the call stack based on changes made by the identified instructions.

15. The computer implemented method of claim 14 wherein a stack frame on the stack has no frame pointer to a previous stack frame base.

16. The computer implemented method of claim 14 wherein no debug information about stack offsets is used.

17. A computer system comprising:
   a central processing unit coupled to a memory; and
   plural executable programs in the memory comprising,
      an application program with an execution state comprising, a stack pointer, an instruction pointer, and wherein the application program further comprises a call stack containing plural stack frames comprising a call chain with plural associated called procedures, each called procedure comprising, a binary image with an associated stack frame;
      an interrupt program that interrupts the application program and saves the execution state, and calls a stack walking program; and
      the stack walking program comprising, instructions for walking forward through binary images to identify instructions used to calculate offsets into the stack frame associated with the binary image, instructions for calculating offsets into stack frames based on identified instructions, instructions that use the calculated offsets for,
      updating an instruction pointer to point to a binary image that called a present binary image, and for updating a stack pointer.

18. The system of claim 17 wherein the stack walking program further comprises:
   instructions for storing the updated pointers to the binary images; and
   continuing to use the updated pointers to find the binary image that called the present binary image, until the stack is empty.

19. A computer implemented method comprising:
   receiving the state of an interrupted process comprising an instruction pointer to a binary image and a stack pointer to a call stack; and
   disassembling forward through a binary image to calculate changes to an instruction pointer and a stack pointer based on an instruction type and a corresponding calculation function in order to move up a call chain of the call stack of the interrupted process.

20. A computer readable storage medium comprising instructions for:
   walking forward through a binary image to identify instructions used to calculate offsets into a stack frame associated with the binary image; and
   calculating offsets into the stack frame based on the identified instructions;
   using the calculated offsets to, update an instruction pointer to point to a binary image that called a present binary image, and update a stack pointer.

21. The computer readable storage medium of claim 20 further comprising instructions for:
   storing the updated instruction pointer; and
   continuing to use the updated pointers to find the binary image that called the present binary image, until the stack is empty.

22. The computer readable storage medium of claim 21 further comprising instructions for:
   interrupting a running process; and
   saving the state of the interrupted process comprising a call stack, an instruction pointer to a first binary image, and a stack pointer.

* * * * *